UNITED STATES PATENT OFFICE.

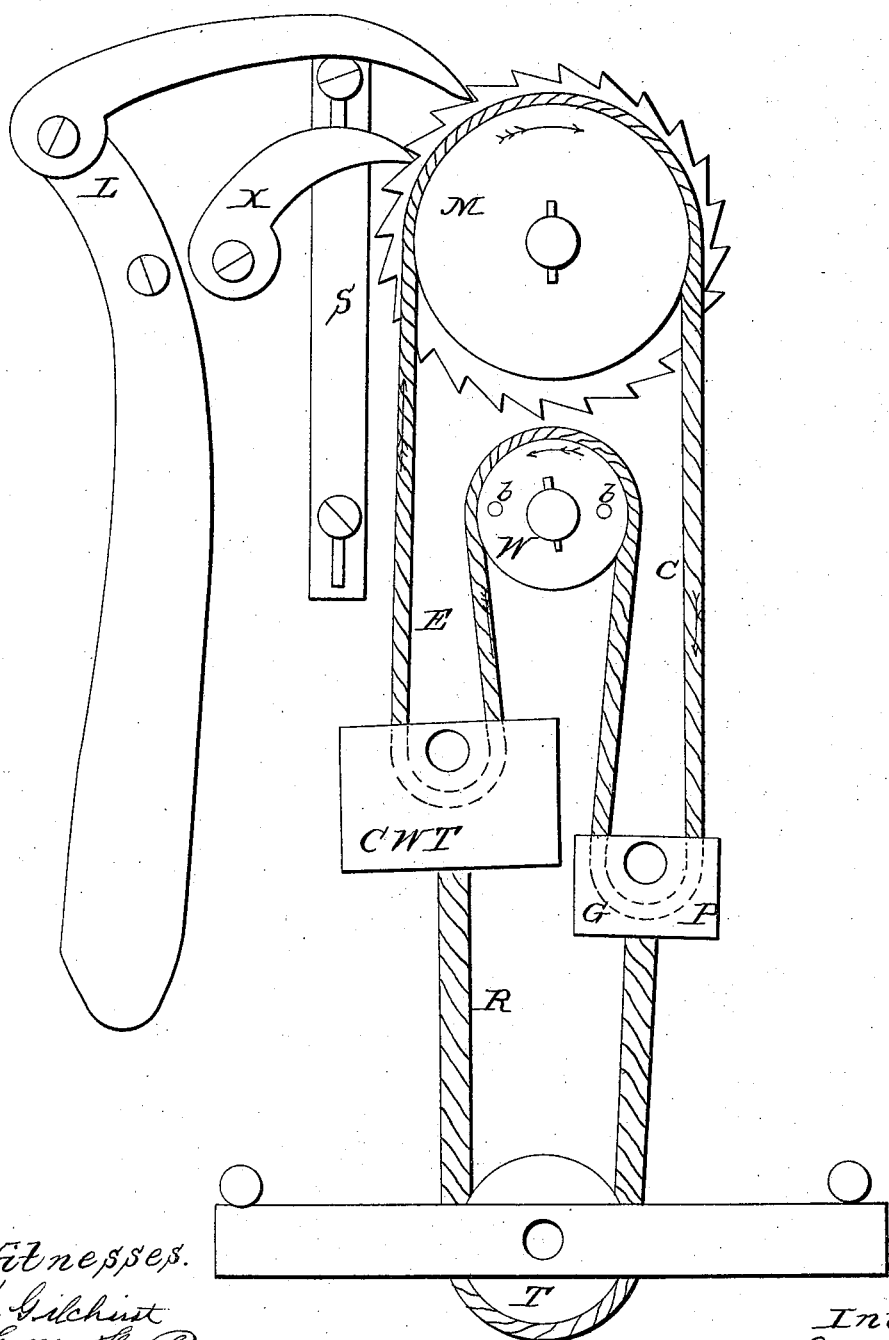

ENOS STEVENS, OF BARNET, VERMONT.

MACHINERY FOR ACCUMULATING AND TRANSMITTING POWER.

Specification of Letters Patent No. 23,794, dated April 26, 1859.

*To all whom it may concern:*

Be it known that I, ENOS STEVENS, of Barnet, in the county of Caledonia and State of Vermont, have invented a new and useful improvement in machinery or apparatus for accumulating, reserving, and at the same or any subsequent time economically transmitting and using motive forces in propelling machinery or operating engines, tools, or measurers of time, to be denominated the "Treasurer of Motion;" and I do hereby declare that the following is a full, clear, and exact description of the construction and operation of the same, reference being had to the annexed perspective drawing, making a part of this specification.

I place a long endless chain, band, or rope, or any flexible belt marked E C in the drawing, around any motive or propelling wheel or shaft M, and also around any working or driven wheel or shaft W; and then, on the propelling or drawing side or portion of said long endless chain or belt, I place a sufficiently heavy weight C W T, suspended by a traversing pulley block attached to, or made part of said weight; but I put only a guide pulley G P on the slack side or portion of said long endless chain or belt. For better securing proper traction between the shaft wheels and the long endless driving chain or belt, and for preventing too much vibration of the weight and guide pulley, when necessary, I usually attach one end of a single oscillating chain, rope, band or flexible belt R, of nearly half of the length of said endless chain or belt, to each of said pulley blocks C W T, and G P, and pass the intermediate length or loop R down under any known tightening pulley or contrivance T.
I also attach a ratchet wheel and pawl or keeper hand X to the motive shaft or wheel M, to prevent its rotating toward said heavy weight. Any known shipper S disconnects and reconnects any motive force or apparatus from, and with, the motive wheel, as said shipper is acted upon by the rising and falling of the heavy weight.

In operating the treasurer of motion, I apply any forces to the motive wheel, and in such direction as to operate directly upon and raise up said heavy weight, and finally cause the wheels and endless chain or belt to rotate or move in that direction, as shown in the drawings by their several arrows; and I receive or take the working power of my improved machinery, amounting to the yielded down gravitation of said heavy weight, from said working or driven wheel or shaft W. When very uniform working power is required, I make the tightening oscillating chain or band R of just double the weight per foot of the propelling long endless chain or belt. In case the power is not expended as fast as accumulated in raising the weight, and it is raised up nearly to the working or motive wheel, then the weight or one of the pulley blocks presses against the shipper S, and disconnects the motive force from the motive wheel M; but when the weight runs down again, the shipper is made to reconnect the motive power to the motive wheel again.

If the motive force or propelling power ceases or intermits while the heavy weight is any raised up, then the descent of the weight on the working or running down side of its traversing pulley will continue to propel the attached working machinery or time measurer until entirely run down. But if the propelling power is again applied before the weight has entirely run down, then it will raise the weight by drawing up on one side of the traversing pulley, without interfering with the tendency to descend by drawing down on the other side and thus rotating the working wheel, and thus maintaining a continuous or incessant operation at the working point, by the use of any sufficient amount of propelling force, however intermittent or variable.

In applying propelling powers to my treasurer of motion, I connect by means of any known or now used mechanism, especially by ratchets, cogs, belts, chain and friction wheels, cranks, sweeps, or cams. In the accompanying drawing my improvement is illustrated by applying a lever and ratchet hand L. In applying the accumulated propelling power of the gravitation of a weight to any required working point, I use any known plan of connection to the working wheel; and regulate the speed by any known governors of speed or power. In the drawing, I connect the working wheel W to any required working machinery or time measurer, by the bolts *b, b,* in the disk or end of the working wheel or shaft. I sometimes use only a pulley and light weight, without the tightening rope and pulley T and R to make the endless chain or band sustain the heavy weight and propel the wheels without slipping on them. When chains and chain wheels are used for the long endless belt, I sometimes dispense with both the guide pulley G P and tightening rope R, depending on the gravitation of the slack part of the long endless chain or band to keep its place or track in the chain-cogged-wheels. But when ropes or smooth belts or bands are used to propel with, I recommend to use all the above mentioned contrivances or fixtures, and also to double wrap the motive and working wheels to prevent the long endless propelling band from slipping. The working and the motive wheels or shaft may be of any relative size to each other, and at any required distance apart, and their axes either parallel, in the same plane, or line, or at any angle from each other; and the proper direction and extent of descent may be given to the pulley blocks and weights, by guide or friction pulleys; and the weights may descend either perpendicularly or at any declivity. When the descent of the weight is too short to secure continuous motion, the endless chain or band is to be compounded over any known system of pulleys, or other mechanical contrivances or powers combined with a heavier weight.

I propose the application of my invention to cases where the motive power is irregular or intermittent, or not acting or available at the required moment; as, for example, the wind, or the expansion and contraction of bodies by heat and cold; but where the working force is required to be quite or nearly uniform, and of long or incessant continuance, as, for example, a lathe, or clock, or a flour mill.

What I claim as my improvement and desire to secure, by Letters Patent, is—

The endless chain E C, forming the pendent loops E and C, supported by the wheels M and W, in combination with the weight C W T, suspended from a pulley supported by the loop E; and the weight or guide pulley G P, and cord R; the whole arranged and operated substantially as described.

ENOS STEVENS.

Witnesses:
J. GLICHRIST,
WM. H. PIERCE.